INVENTOR.
OSCAR LUTHI
ATTORNEY

United States Patent Office 3,403,786
Patented Oct. 1, 1968

3,403,786
ROTARY DRUM FILTER
Oscar Luthi, Nashua, N.H., assignor to Improved Machinery Inc., Nashua, N.H., a corporation of Delaware
Filed Aug. 25, 1966, Ser. No. 575,182
17 Claims. (Cl. 210—217)

This invention relates to drum filters and has more particular reference to the provision of a new and improved rotary drum filter which is particularly constructed and arranged for filtering a slurry such as the paper pulp stock employed in the manufacture of paper.

Conventionally, a rotary drum filter for filtering paper pulp stock comprises a filter drum which is formed with a circumferential fiber collecting surface such as a screen. The filter drum is partially submerged in a vat, tank, or other container of relatively thin paper pulp stock and rotatably driven such that fibers in the pulp stock form a filter cake, mat, or coating of filtered stock on the fiber collecting surface. The rotation of the filter drum carries this filtered stock above the level of the pulp stock in the container where it is washed, dried, and stripped from the filter drum by either mechanical or fluid doctor means.

Generally, an apparatus is employed for creating a subatmospheric pressure or vacuum in the pulp stock in the container to facilitate the collection of filtered stock by the filter drum. This vacuum creating apparatus has usually taken the form of a single barometric leg arranged to draw fiber onto the fiber collecting surface while discharging filtrate passing through the fiber collecting surface from the container. Usually this same barometric leg has been employed to create a subatmospheric pressure or vacuum in the air within the filter drum for facilitating the washing and drying of the filtered stock which is collected on the fiber collecting surface.

The fiber collecting surface, when initially submerged into the pulp stock during each rotation of the filter drum, is substantially devoid of fibers. Thus, until an initial layer of filtered stock has accumulated upon the fiber collecting surface, an undesirably large quantity of fine fibers passes through the fiber collecting surface and is discharged through the barometric leg. This fine fiber loss increases commensurately with an increase in the rotational velocity of the filter drum. The use of a single barometric leg for removing all of the filtrate from the container contaminates all of the filtrate with this large quantity of the fine fibers and requires that a filter be disposed within the filtrate discharge line for preventing these fine fibers from passing to the evaporator or sewer receiving the filtrate.

The use of a single barometric leg or similar vacuum creating apparatus for forming a vacuum in both the air and the filtrate within the filter drum is similarly undesirable. The air within the filter drum should be provided with a relatively high degree of vacuum to enable the filtered stock on the filter drum to attain maximum dryness prior to its removal from the filter drum. The pulp stock within the filter drum should be provided with a substantially lower degree of vacuum, otherwise the filtered stock will compact and slow the filtration process. The use of a single barometric leg or similar vacuum creating apparatus to form a vacuum in both the pulp stock and the air, of course, necessitates that a common degree of vacuum be provided in both the air and the pulp stock. Thus, in conventional rotary drum filters, either maximum filtered stock dryness or maximum filtering efficiency, or both, must be sacrificed. Furthermore, the beforedescribed dual use of a single vacuum creating apparatus requires that the latter simultaneously convey relatively large quantities of both air and filtrate and thereby greatly impairs its efficiency.

An object of the present invention is to provide a new and improved rotary drum filter which is particularly constructed and arranged such that separate vacuums may be provided adjacent different portions of the filter drum to overcome the aforedescribed defects of conventional rotary drum filters.

Another object of the invention is to provide a new and improved rotary drum filter which is particularly constructed and arranged to allow separate vacuums to be provided in the air and the pulp stock adjacent the filter drum such that the rotary drum filter may provide maximum drying of the filtered stock while operating at maximum filtering efficiency.

Another object is to provide a new and improved rotary drum filter which is particularly constructed and arranged to allow the filtrate filtered from the fibers in the pulp stock to be separated to control the quantity of fine fibers in the filtrate discharged to the sewer or evaporator receiving filtrate from the rotary drum filter.

These objects, and the other objects and advantages of the invention which will be apparent from the following description taken in connection with the accompanying drawings, are obtained by the provision of a rotary drum filter comprising an inner drum member, and an outer drum member extending peripherally around the inner drum member. The outer drum member is spaced from the inner drum member to provide a space between the drum members peripherally around the inner drum member. A rolling means is disposed within the space between the drum members for supporting the outer drum member upon the inner drum member and dividing the space into a plurality of compartments. One of the drum members is constructed to collect filtered stock during its rotation; and a means is provided for rotating this one of the drum members.

Referring to the drawings:
FIG. 1 is an elevational side view, partially broken away and in section, of a rotary drum filter constructed in accordance with the present invention;

Figure 1:
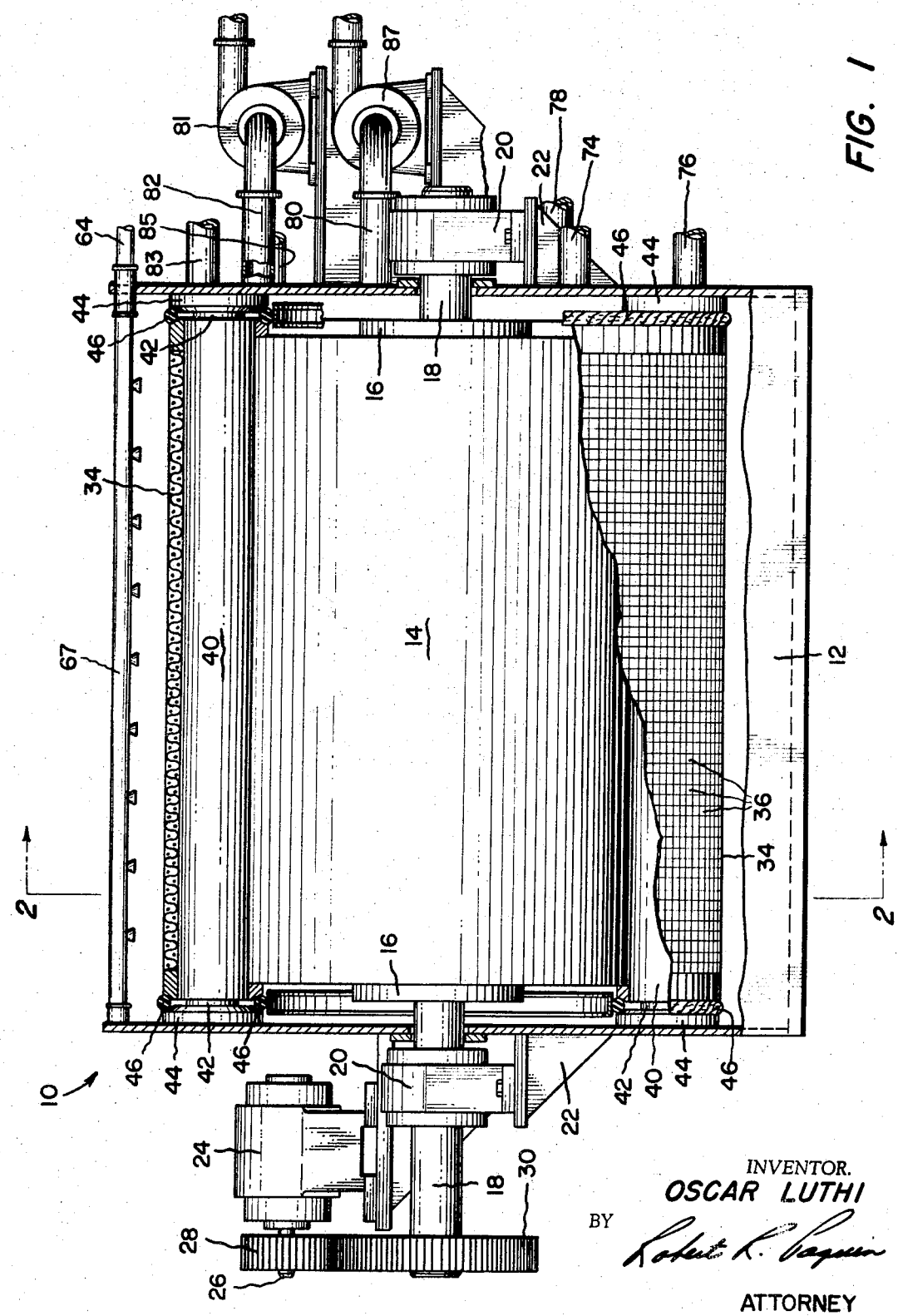
Figure 2:
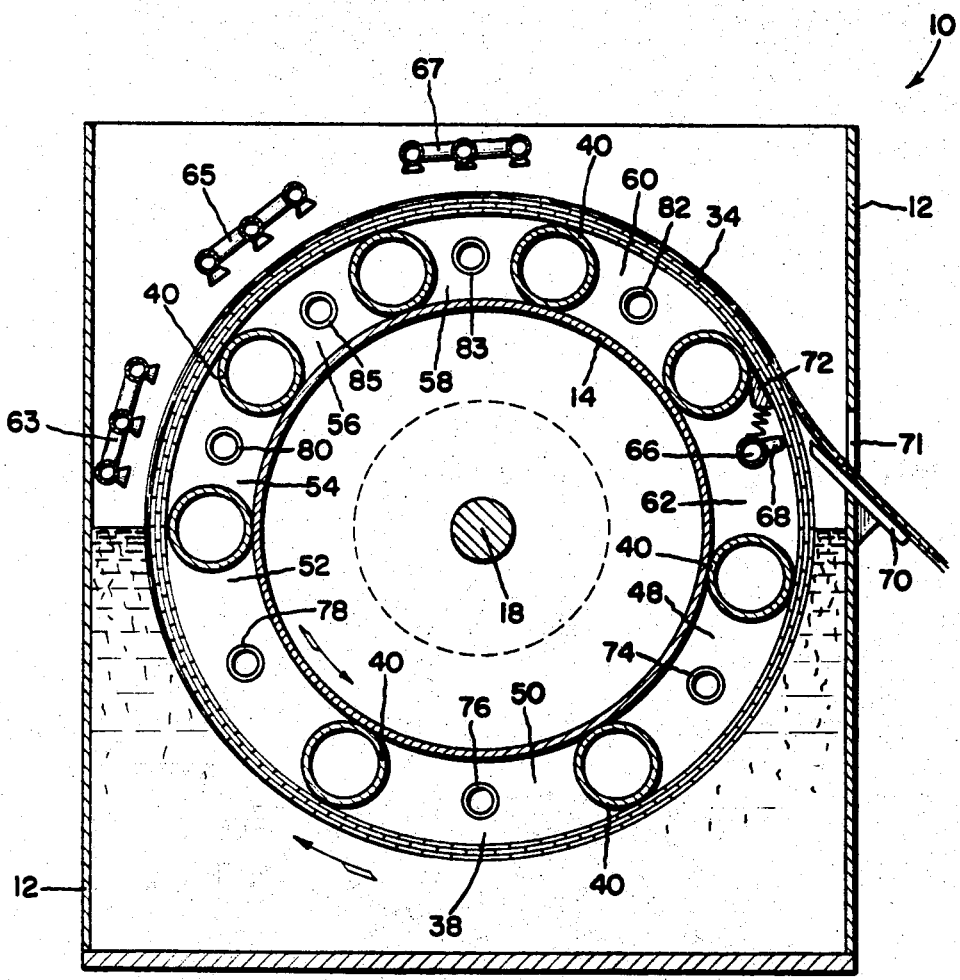
FIG. 2 is a sectional view taken on line 2—2 of FIG. 1 looking in the direction of the arrows.

Referring more particularly to the drawings wherein similar reference characters designate corresponding parts throughout the several views, FIGS. 1 and 2 illustrate a rotary drum filter designated generally as 10 which is located in a vat or tank 12 for filtering relatively thin paper pulp stock contained within the vat 12. The vat 12 is suitably connected to receive sufficent paper pulp stock during the operation of the rotary drum filter 10 to maintain its contained paper pulp stock at substantially the level illustrated in FIG. 2.

The rotary drum filter 10 comprises an imperforate, cylindrical supporting drum 14 which is arranged on a horizontal axis and partially submerged within the paper pulp stock contained in the vat 12. The opposing ends of the supporting drum 14 are each closed by a circular end plate 16 which is rigidly secured along its circumference to the supporting drum 14 to prevent the paper pulp stock in the vat 12 from leaking into the supporting drum 14. A supporting shaft 18 is rigidly connected to the end plates 16 and rotatably journalled in bearings (not shown) carried by bearing housings 20 supported by supports 22 which are mounted upon the opposing end walls of the vat 12.

The supporting shaft 18 is rotatably driven by a driving motor 24 through a motor output shaft 26 which rigidly carries a driving gear 28 and is rotatable by the driving motor 24. The supporting shaft 18 rigidly carries a driven gear 30 which meshes with the driving gear 28 to be rotatably driven by the driving gear 28. In the embodiment of the invention illustrated in FIGS. 1 and 2, as indicated by the arrow shown within the supporting drum 14 in FIG. 2, the driving motor 24 is adapted to rotate the supporting shaft 18 and the supporting drum 14 in a counterclockwise direction, as viewed in FIG. 2.

A cylindrical filter drum 34, concentric with the supporting drum 14, is partially submerged in the paper pulp stock in the vat 12 circumferentially around the supporting drum 14. The filter drum 34, as illustrated in FIGS. 1 and 2, is formed from a plurality of arcuately contoured plastic plates, each having drainage openings 36 therethrough, which are bolted or otherwise rigidly connected into a unitary structure. Alternatively, however, the filter drum 34 may be formed as disclosed in United States Patent No. 3,105,043, issued Sept. 24, 1963, to John P. Rich et al. or may be of substantially any other construction suitable for collecting filtered stock upon rotation in a container of paper pulp stock. The filter drum 34 is radially spaced from the supporting drum 14 to provide an annular space 38 between the supporting and filter drums 14 and 34, respectively. The annular space 38, due to the aforedescribed partial submergence of the supporting drum 14 and the filter drum 34 in the paper pulp stock in the vat 12, extends below the level of the paper pulp stock at its lower end and above the level of the paper pulp stock at its upper end.

A plurality of arcuately spaced, cylindrical rollers 40 are located transversely through the annular space 38 in frictional engagement with the outer circumference of the supporting drum 14 and the inner circumference of the filter drum 34 and support the filter drum 34 upon the supporting drum 14. The rollers 40, as illustrated in FIG. 1, are each constructed of a length at least the lateral width of the annular space 38. The rollers 40 are each rigidly mounted upon a roller supporting shaft 42 which is journalled for rotation about a stationary axis in bearings (not shown) carried by bearing supports 44 rigidly connected to the opposing end walls of the vat 12. A plurality of rope type, annular seals 46 are provided for preventing the paper pulp stock in the vat 12 from leaking into the annular space 38 adjacent the lateral ends of the annular space 38.

The rollers 40 are arranged to divide the annular space 38 into a plurality of compartments 48, 50, 52, 54, 56, 58, 60, 62 which, due to the aforedescribed engagement of the rollers 40 with the supporting drum 14 and the filter drum 34, are sufficiently isolated from each other to contain separate vacuums of different degrees. It will be understood, however, that additional rollers (not shown) of lengths shorter than the lateral width of the annular space 38 may be located in these compartments for providing additional support for the filter drum 34.

Figure 3:
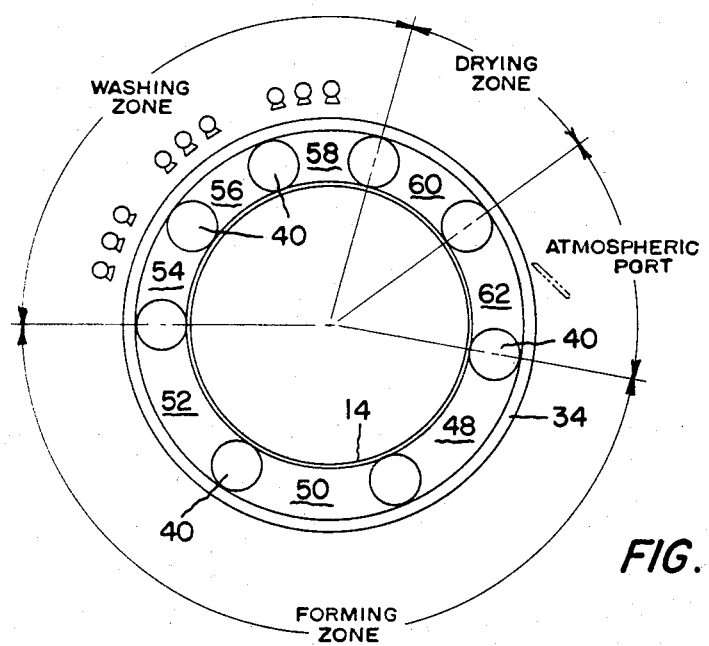
FIG. 3 is a schematic view showing the operating zones of the rotary drum filter shown in FIGS. 1 and 2.

The compartments 48, 50, 52, as shown in FIG. 2, are formed in the lower end of the annular space 38 below the level of paper pulp stock maintained in the vat 12 during the operation of the rotary drum filter 10. The compartments 48, 50, 52, as shown in FIG. 3, define the forming zone of the rotary drum filter 10 opposite which, during the rotation of the filter drum 34, a coating of filtered stock is collected by the filter drum 34.

The compartments 54, 56, 58 are formed in the upper end of the annular space 38 above the level of paper pulp stock maintained in the vat 12 and immediately clockwise from the compartment 52 in the forming zone. A plurality of showers 63, 65, 67 are located circumferentially of the filter drum 34 adjacent the compartments 54, 56, 58, respectively, for directing cleansing fluid on the filtered stock collected on the filter drum 34 as such is carried past the compartments 54, 56, 58. The compartments 54, 56, 58, thus, as shown in FIG. 3, define the washing zone of the rotary drum filter 10.

In the embodiment of the invention illustrated in FIGS. 1 and 2, the showers 63, 65, 67 are connected to a source (not shown) of fresh water to serially receive water from the source. More specifically, the showers 67 are connected to the source of fresh water by a conduit 64 to directly receive fresh water from the source. A conduit 83, connected to the showers 65 to supply water thereto, extends into the compartment 58 and is provided with a vacuum pump (not shown) for creating a subatmospheric pressure or vacuum in the compartment 58 sufficient to cause water in the latter to flow through the conduit 83 to the showers 65. A conduit 85, connected to the showers 63 to supply water thereto, extends into the compartment 56 and is provided with a vacuum pump (not shown) for creating a subatmospheric pressure or vacuum in the compartment 56 sufficient to cause water in the latter to flow through the conduit 85 to the showers 63. As a result of this serial connection of the showers 63, 65, 67 to the source of fresh water, the washing of the filtered stock on the filter drum 34 requires only minimum quantities of fresh water.

The compartment 60 is formed in the upper end of the annular space 38 above the level of the paper pulp stock in the vat 12 and immediately clockwise from the compartment 58 in the washing zone. The compartment 60, as shown in FIG. 3, defines the drying zone of the rotary drum filter 10 opposite which the filtered stock previously washed in the washing zone is dried prior to being removed from the filter drum 34.

The compartment 62 formed at the upper end of the annular space 38 intermediate the compartment 60 in the drying zone and the compartment 48 in the forming zone, as shown in FIG. 3, defines the atmospheric port of the rotary drum filter 10. A hydraulic doctor comprising a fluid supply conduit 66, operatively connected to a source (not shown) of pressurized fluid to continuously receive pressurized fluid from such source, extends into the compartment 62. The fluid supply conduit 66 is provided with a plurality of nozzles 68 adapted to direct streams of the pressurized fluid onto the filter drum 34 for removing the filtered stock from the filter drum 34. The vat 12, as will be seen from FIG. 2, carries a doctor blade 70 in spaced relationship to the filter drum 34 adjacent the compartment 62. The doctor blade 70 receives the filtered stock removed from the filter drum 34 by the hydraulic doctor and directs it through an opening 71 in the vat 12 to the succeeding stage of the paper making operations. It is, of course, important that the compartment 62 be completely sealed from the drying zone defined by the compartment 60. Thus, a tapered sealing member 72 is spring biased between the roller 40 at the clockwise end of the compartment 60 and the filter drum 34 to insure that no leakage occurs between the compartments 60, 62 around this roller 40.

The vacuum forming apparatus of the rotary drum filter 10, in addition to the beforedescribed vacuum pumps for the compartments 56, 58, comprises means for independently creating a separate subatmospheric pressure or vacuum in each of the compartments 48, 50, 52 in the forming zone, the compartment 54 in the washing zone, and the single compartment 60 in the drying zone. More specifically, the barometric legs 74, 76, and 78 are connected to the compartments 48, 50, 52, respectively, of the forming zone to independently create a subatmospheric pressure or vacuum in the paper pulp stock adjacent the filter drum 34 in their respective connected compartments. The degree of vacuum created by the barometric legs 74, 76, 78 in the compartments 48, 50, 52 is maintained sufficiently low that the filtered stock collected on the filter drum 34 adjacent these compartments does not compact on the filter drum 34.

The barometric legs 74, 76 are suitably connected to discharge filtrate received from the compartments 48, 50, respectively, to the source of the pulp stock contained in the vat 12. The barometric leg 78 is suitably connected to discharge filtrate received from the compartment 52 to an evaporator or sewer (not shown). As the major portion of the fine fibers received by the barometric legs 74, 76, 78 will be received by the barometric legs 74, 76 from the compartments 48, 50, respectively, the aforedescribed connections of the barometric legs 74, 76, 78 insure that only the filtrate containing the least fine fiber is discharged to the evaporator or sewer. Thus, the necessity for a filter in the filtrate discharge line is eliminated.

A conduit 80, containing a vacuum pump 87, is connected to the compartment 54 of the washing zone such that a subatmospheric pressure or vacuum is created adjacent the filter drum 34 in the compartment 54. This vacuum draws cleansing fluid from the showers 63 onto the filtered stock on the filter drum 34 as such filtered stock is rotated past the compartment 54. The conduit 80 is suitably connected to discharge air and cleansing fluid received from the compartment 54 to the source of paper pulp stock supplied to the vat 12.

A conduit 82, connected to a vacuum pump 81, is connected to the single compartment 60 of the drying zone to create a sub-atmospheric pressure or vacuum within the compartment 60 adjacent the filter drum 34 for facilitating the drying of the filtered stock on the filter drum 34. This employment of a vacuum pump 81 for creating a vacuum in the compartment 60, as will be seen, makes the degree of vacuum maintained in the compartment 60 independent of that in the forming zone. Thus, the degree of vacuum provided in the compartment 60 may be far in excess of that in the forming zone; and the filtered stock resultantly may be provided with maximum dryness before its discharge from the filter drum 34.

In the operation of the aforedescribed rotary drum filter 10, rotation imparted to the motor shaft 26 by the driving motor 24, is transmitted through the gears 28, 30 into conjoined counterclockwise rotation, as viewed in FIG. 2, of the supporting shaft 18 and the supporting drum 14. The counterclockwise rotation of the supporting drum 14 rotatably drives the rollers 40 to cause clockwise rotation of the filter drum 34, as indicated by the arrow circumferentially of the filter drum 34 in FIG. 2.

During the rotation of the filter drum 34, filtered stock is collected on the latter opposite the forming zone defined by the compartments 48, 50, 52. The barometric legs 74, 76, 78 facilitate this collection of filtered stock by forming vacuums within the compartments 48, 50, 52, respectively, to draw fiber onto the filter drum 34. The filtrate removed from the compartments 48, 50 by the barometric legs 74, 76, respectively, during this forming process is discharged to the source of the pulp stock in the vat 12. The filtrate removed from the compartment 52 by the barometric leg 76 is discharged to an evaporator or sewer. This separation of the filtrate, as was previously described, results in only the filtrate from the compartment 52, which is the filtrate containing fewest of the fine fibers, being sent to the evaporator or sewer. Thus, the necessity for a filter in the filtrate discharge line of the rotary drum filter 10 is eliminated.

Simultaneously, the filtered stock previously collected on the filter drum 34 is washed by cleansing fluid from the showers 63, 65, 67 as it is carried past the compartments 54, 56, 58 of the washing zone and then dried as it passes the single compartment 60 of the drying zone. The use of a separate vacuum forming apparatus for creating a vacuum in the compartment 60 enables a higher degree of vacuum to be maintained in the compartment 60 than in the compartments 48, 50, 52. Thus, the collected filtered stock may be provided with maximum dryness prior to its discharge from the filter drum 34 without causing compacting of the filtered stock as it is collected on the filter drum 34 opposite the forming zone. The dried filtered stock is removed from the filter drum 34 by the hydraulic doctor formed by the fluid supply conduit 66, and the associated nozzles 68, and received by the doctor blade 70 which conveys it to the succeeding step in the paper making operations.

Figure 4:
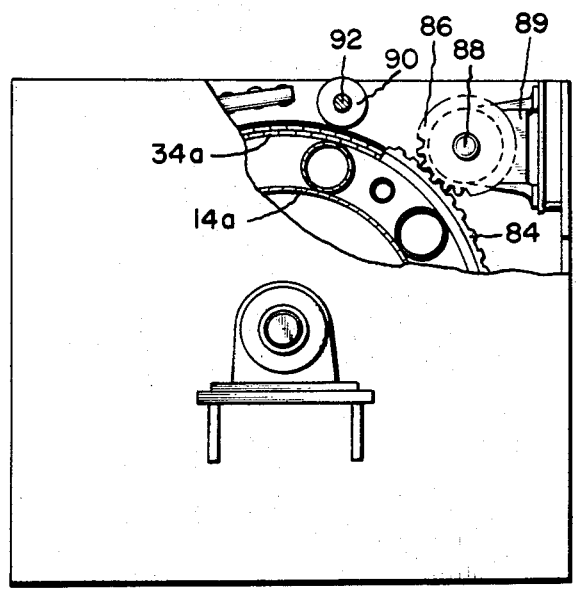
FIG. 4 is an elevational view, partially broken away and in section, of a rotary drum filter constructed in accordance with an alternative embodiment of the invention.

FIG. 4, wherein all elements similar to those previously described with reference to the embodiment of the invention illustrated in FIGS. 1 through 3 are designated by the reference character for their similar previously described part followed by the suffix a, illustrates an alternative embodiment of the present invention. The embodiment of the invention illustrated in FIG. 4 primarily differs from that of FIGS. 1 through 3 in that the filter drum 34a is connected to its rotating means independently of the supporting drum 14a. More specifically, a circumferential ring gear is rigidly carried by the filter drum 34a. A driving gear 86 carried by a driving shaft 88 which is rotatable by a motor 89 meshes with the ring gear 84 to rotatably drive the filter drum 34a.

In addition, as illustrated in FIG. 4, a press roll 90 is carried by a shaft 92 circumferentially of the filter drum 34a. The press roll 90, as illustrated in FIG. 4, is located opposite one of the rollers 40a in which position it imposes no substantial additional stress upon the filter drum 34a.

The operation of the embodiment of the invention illustrated in FIG. 4 is believed to be apparent from the aforedescribed operation of the embodiment of the invention illustrated in FIGS. 1 through 3.

From the aforegoing, it will be seen that I have provided new and improved means for accomplishing all of the objects and advantages of my invention. It will be understood, however, that, although only two embodiments of my invention have been illustrated and described in detail, my invention is not limited merely to these described embodiments but includes other embodiments and variations which utilize the concepts and teachings of my invention.

Having thus described my invention, I claim:

1. In a rotary drum filter adapted to be located in a container of pulp stock for filtering pulp stock in said container, the combination of:
   an inner drum member;
   an outer drum member extending peripherally around said inner drum member and spaced from said inner drum member to provide a space between said drum members peripherally around said inner drum member;
   rolling means disposed within said space between said drum members for supporting said outer drum member upon said inner drum member and dividing said space into a plurality of compartments;
   one of said drum members being constructed to collect filtered stock during rotation; and
   means for rotating said one of said drum members.

2. A rotary drum filter according to claim 1, wherein means are provided for creating separate vacuums in two of said compartments.

3. A rotary drum filter according to claim 1, wherein said rotating means comprises means for rotating the other of said drum members, and said rolling means connect said drum members to transmit rotation from said other of said drum members to said one of said drum members.

4. A rotary drum filter according to claim 1, wherein said rotating means is connected to said one of said drum members independently of the other of said drum members.

5. A rotary drum filter according to claim 1, wherein said drum members are concentrically arranged on a horizontal axis, and said one of said drum members is said outer drum member.

6. In a rotary drum filter adapted to be located in a container of pulp stock for filtering pulp stock in said container, the combination of:
   a supporting drum;
   a filter drum concentric with said supporting drum and radially spaced from said supporting drum to provide an annular space between said drums;

said filter drum being constructed to collect filtered stock during rotation;

a plurality of spaced rollers disposed within said annular space for supporting said drums in spaced relationship and dividing said annular space into a plurality of compartments;

means supporting said rollers for rotation around stationary axes;

means for creating separate vacuums in two of the compartments formed by said rollers; and means for rotating said filter drum.

7. A rotary drum filter according to claim 6, wherein said drum rotating means comprises means for rotating said supporting drum and said rollers are connected to said supporting and filter drums to transmit rotation from said supporting drum to said filter drum.

8. A rotary drum filter according to claim 6, wherein said drum rotating means is connected to said filter drum independently of said supporting drum.

9. A rotary drum filter according to claim 6, wherein said drums are arranged on a horizontal axis, said rollers divide said annular space to provide a plurality of compartments adjacent the lower end of said annular space and a plurality of compartments adjacent the upper end of said annular space, washing means are provided for directing cleansing fluid on filtered stock collected on said filter drum as the filtered stock is carried past one of said upper end compartments, and said vacuum creating means comprises means for creating a vacuum in one of said lower end compartments sufficient to cause filtered stock to be collected on said filter drum when said lower end compartments are located in a container of pulp stock and means for creating a separate vacuum in an upper end compartment sufficient to cause drying of filtered stock washed by said washing means.

10. A rotary drum filter according to claim 9, wherein said filter drum is disposed circumferentially around said supporting drum, means are provided for removing filtered stock from said filter drum after the filtered stock has been dried by said vacuum creating means, and a means is provided for creating a vacuum in said upper end compartment adjacent which said washing means wash the filtered stock.

11. In a rotary drum filter adapted to be located in a container of pulp stock for filtering pulp stock in said container, the combination of:

a supporting drum;

a filter drum concentric with said supporting drum and radially spaced from said supporting drum to provide an annular space between said drums;

said filter drum being constructed to collect filtered stock during rotation;

a plurality of rollers disposed within said annular space for supporting said drums in spaced relationship and dividing said annular space into a forming zone opposite which, when said drum filter is located in a container of pulp stock, filtered stock is collected on said filter drum, a washing zone opposite which filtered stock collected on said filter drum is washed by a cleansing fluid, and a drying zone opposite which the washed filtered stock on said filter drum is dried;

washing means disposed adjacent said washing zone for directing cleansing fluid on the filtered stock collected on said filter drum as the filtered stock is carried by said filter drum past said washing zone;

means for creating separate vacuums in said forming and drying zones; and means for rotating said filter drum.

12. A rotary drum filter according to claim 11, wherein said drum rotating means comprises means for rotating said supporting drum and said rollers are connected to said supporting and filter drums to transmit rotation from said supporting drum to said filter drum.

13. A rotary drum filter according to claim 11, wherein said drum rotating means is connected to said filter drum independently of said supporting drum.

14. A rotary drum filter according to claim 11, wherein said drums are arranged on a horizontal axis, said forming zone is formed at the lower end of said annular space, said rollers divide said forming zone into a plurality of compartments, and said vacuum creating means comprises means for forming a vacuum in each of the compartments of said forming zone.

15. A rotary drum filter according to claim 14, wherein said filter drum is disposed circumferentially around said supporting drum.

16. A rotary drum filter according to claim 11, wherein the vacuum creating means for said drying and forming zones are constructed to create different degrees of vacuum in said forming and drying zones.

17. A rotary drum filter according to claim 11, wherein a means is provided for creating a vacuum in said washing zone.

References Cited

UNITED STATES PATENTS

| | | | |
|---|---|---|---|
| 2,734,635 | 2/1956 | Holzenthal | 210—393 X |
| 3,152,986 | 10/1964 | Bice et al. | 210—67 |
| 3,363,774 | 1/1968 | Luthi | 210—404 |

SAMIH N. ZAHARNA, *Primary Examiner.*

T. A. GRANGER, *Assistant Examiner.*